H. FALTERMAYER & C. B. THWING.
GRAPHIC RECORDER.
APPLICATION FILED APR. 18, 1913.
1,137,596.
Patented Apr. 27, 1915.
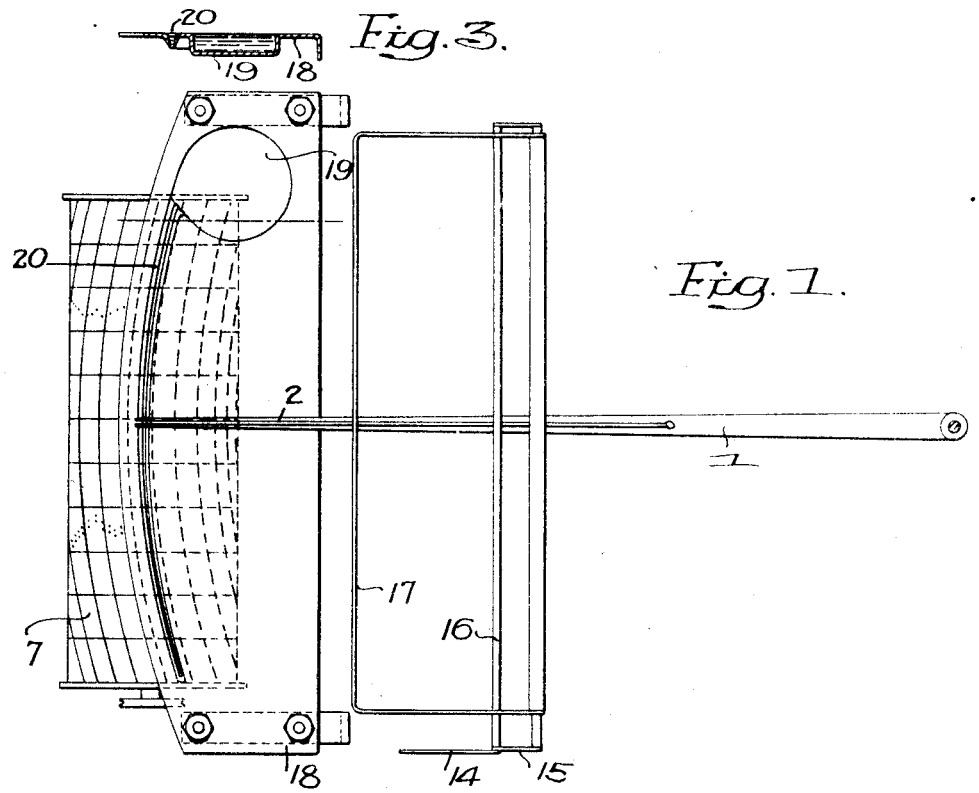
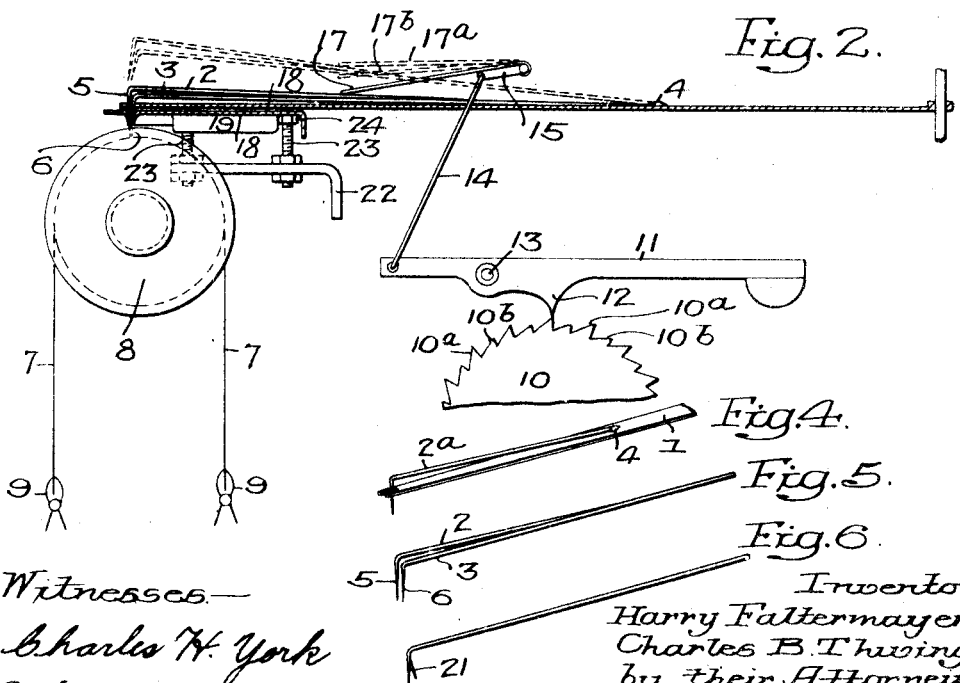
Witnesses—
Charles H. York
Will S. Bimore
Inventors
Harry Faltermayer
Charles B. Thwing.
by their Attorneys
Howson & Howson

UNITED STATES PATENT OFFICE.

HARRY FALTERMAYER AND CHARLES B. THWING, OF PHILADELPHIA, PENNSYLVANIA, ASSIGNORS TO THWING INSTRUMENT COMPANY, OF PHILADELPHIA, PENNSYLVANIA, A CORPORATION OF PENNSYLVANIA.

GRAPHIC RECORDER.

1,137,596.  Specification of Letters Patent.  Patented Apr. 27, 1915.

Application filed April 18, 1913. Serial No. 762,084.

*To all whom it may concern:*

Be it known that we, HARRY FALTERMAYER and CHARLES B. THWING, both citizens of the United States, residing in Philadelphia, Pennsylvania, have invented certain Improvements in Graphic Recorders, of which the following is a specification.

One object of our invention is to provide a novel device for forming an ink record upon a chart by means of pens, the apparatus being designed to require a minimum of power for its operation, and being especially adapted for use in connection with or as part of recording instruments dealing with extremely small quantities of electrical or other energy.

We further desire to provide a graphic recorder in which one or more records may be made upon a chart by a pen and in which the ink for making records is automatically supplied from a reservoir of novel construction without requiring movement of either the pen or the reservoir for its application.

We also desire to provide a graphic recorder having the above noted characteristics with a novel form of pen designed to be capable of forming a plurality of records on a chart for indicating the variation of two or more quantities.

The invention also contemplates novel means for insuring a continuous ink supply to one or more moving pens, said pens being periodically caused to pass through a thin film of ink and thereafter form a record on a chart with the ink so received.

It is further desired to provide graphic recorders with one or more novel forms of pens whose construction shall be such as to prevent the ink from dropping onto the chart while insuring sufficient ink to form the record.

These objects and other advantageous ends we secure as hereinafter set forth, reference being had to the accompanying drawings, in which:

Figure 1, is a plan of a portion of a graphic recorder constructed according to our invention; Fig. 2, is a side elevation, partly in section, of the apparatus shown in Fig. 1; Fig. 3, is a vertical section on the line *a—a*, Fig. 1; and Figs. 4, 5 and 6, are perspective views of various forms of pens which may be used as part of our invention.

In the above drawings, 1 represents a portion of the indicator or other movable element of an instrument such as a millivoltmeter, and this indicator at its end carries what will hereafter be referred to as the pen or pens. In Figs. 1 and 2 this part consists of two relatively thin wires 2 and 3, of which the first is fixed to or mounted on the indicator at 4 and extends parallel with the same to a point adjacent its outer end where it is bent down at right angles to form the recording portion or stylus 5. The second pen 3 is shown as attached to or formed as part of the first pen, (though it may be independently mounted on the indicator) and it likewise extends to a point adjacent the end of said indicator where it also is bent downwardly at right angles to form a recording portion or stylus 6. Both the pens are preferably made of spring wire or other material of suitable composition and are so formed and mounted that their downwardly turned ends are guided by the forked or perforated end portion of the indicator.

A chart 7, which may be any of the forms of record receiving materials or structures known to the art, is shown in the present instance as a ribbon or web of paper mounted upon a roller 8 which under operating conditions is driven at a predetermined speed by any desired or suitable form of mechanism (not shown). Said chart 7 is passed around or rests upon the roller 8 and is kept taut by weights 9 in the form of clips hung to its two ends. For periodically causing the pens to engage the web or chart 7, we provide suitable depressing mechanism, such for example, as that shown in an application for patent filed by Charles B. Thwing No. 755,943, on March 21, 1913.

In Figs. 1 and 2, we have illustrated sufficient of the operating mechanism to render the action of our invention intelligible, and in these figures, 10 represents a ratchet wheel driven at a suitable speed by a clock or other mechanism, and having teeth 10ª and 10ᵇ which are alternately high and low relatively to each other. Coöperating with this ratchet wheel is a tooth 12 forming part of a lever 11 pivoted at 13 to any suitable supporting structure. To that arm of the lever on the opposite side of the pivot from the tooth 12 is connected one end of a link 14, whose second end is attached to an arm 15 forming part of or connected to a primary depressor 16, extending under a U-shaped body of wire 17 constituting a secondary depressor. The design of this secondary depressor is such that its central portion extends above the indicator 1 and the two pens 2 and 3, so as to be capable of engaging and forcing the latter downwardly at any point of their possible path of movement. For supplying ink to the pens, we provide a plate 18 mounted in a substantially horizontal plane and having, usually adjacent one end, a depression or other form of reservoir 19 from one side of which extends a downwardly tapering slot 20, curved or otherwise shaped to conform to the path of movement of the end portions 5 and 6 of the two pens. The plate is so mounted that this slot 20 lies immediately under said pens and it is to be understood that although it tapers downwardly, it is open at the bottom from a point adjacent where it enters the ink well or reservoir 19 to its opposite end. Moreover, the slot as well as the opening in its bottom gradually decreases in width outwardly from the ink well, and with such a construction, if ink of suitable composition be delivered to the reservoir 19, it may be drawn or caused to flow from one end of the slot to the other in the shape of a thin film which spans the opening in the bottom of the slot.

Under conditions of operation, the indicator 1 of the instrument whose performance it is desired to record, oscillates over the plate 18 and over the top portion of the chart 7, with the portions 5 and 6 of the pens preferably immediately above the ink film of the slot 20. If the ratchet wheel be driven as above noted, the lever 11 is caused to oscillate on its pivot by reason of the alternate raising and dropping of its tooth 12, and each time said tooth rides upon one of the smaller teeth 10$^a$, the link 14 is drawn downwardly with the bar forming the primary depressor 16 so that the secondary depressor 17 is allowed to fall under the action of gravity from the position shown at 17$^a$ to that shown at 17$^b$. As a result the uppermost of the needles 2 is forced downwardly and its end 5 in passing through the film of ink in the slot 20, collects sufficient of said ink to make a visible record when it is brought into engagement with the surface of the chart 7. The dropping off of the tooth 12 from one of the lower teeth 10$^a$ of the ratchet wheel then causes the link 14 to be raised and with it the primary depressor 16, thus also raising the secondary depressor 17 and permitting the pen 5 to rise by reason of its springing nature or support. Immediately thereafter the tooth 12 of the lever 11 rides upon one of the higher teeth 10$^b$ of the ratchet wheel 10 so that the link 14 and primary depressor 16 are drawn downward for a distance greater than that occuring in the first instance, thus causing the secondary depressor 17 to first move the part 5 of the pen through the ink film onto the chart, and thereafter to similarly move the part 6 of the pen 3. There is thus formed a record which consists of a single dot, and thereafter there is formed a second record consisting of two dots side by side or one in front of the other, depending on the arrangement and design of the pens. As before, when the tooth 12 of the lever 11 drops off of the higher actuating tooth 10$^b$, the link 14 and both depressors are raised from the position shown in full lines at 17$^a$.

We have found that by capillary attraction, the ink flows from the reservoir 19 into the slot as it is used by the pens or evaporates, and note that it is advisable to taper the said slot 20 and particularly the opening in its bottom, from the reservoir 19 to its end, since under the action of the above force, the ink in the film tends to flow from a broad opening or long span to a shorter span or narrower opening.

One of the prime advantages of the construction above described is its extreme simplicity and small consumption of power, the particular combination above described being especially applicable to that form of apparatus in which an electrical instrument is alternately and automatically connected in circuit with two different sources of current, the indicator in each instance immediately taking up a position corresponding to the quantity of current then flowing through the instrument. The operation of the ratchet wheel 10 is so timed that the secondary depressor is allowed to descend immediately after and each time the indicator with the pens has come to occupy the position resulting from the connection of the instrument to one of the two sources of current, so that two clearly distinguishable records are formed on the chart, of which the first consists of a succession of single dots and constitutes the record of the current flow in the circuit including one of the sources. The other record consists of a line or curve formed of a succession of pairs of dots and thus gives a visible indication of the performance of the instrument when connected in circuit with the second current source. Obviously the instrument may be calibrated so that the lines or curves produced may be interpreted in any desired units, although it is to be understood that the mechanism for actuating the indicator 1 forms no part of the present invention, having been described and claimed in a patent granted to Charles B. Thwing on December 10, 1912, No. 1,046,680.

While the form of pen shown in Fig. 2 has its chart engaging points so arranged that they make dots side by side, we may of course employ a pen having but a single chart engaging point such as that indicated at 2ª in Fig. 4. This single pen is fixed to the indicator 1 of any desired instrument and is preferably guided by the forked end thereof in the same manner in which the two pen points are guided in that form of our invention shown in Fig. 2. In order to prevent the possibility of any of the pens shown in the drawings collecting such a quantity of ink from the film as will permit a small drop to run down and fall on the chart, we may provide its point with a spur 21 whose point diverges from and terminates above the extremity of said point as shown in Fig. 6. By this means the above possibility is avoided since the ink is retained by capillary action from passing in a mass below the diverging end of the spur. In order to regulate the amount of ink gathered by the pen as it passes through the film and deposited by it on the chart, we may if desired, provide means whereby the distance of the film carrying plate 18 from the film may be varied, and while such means may take any of a number of forms, we have shown in Figs. 1 and 2, supporting brackets 22 carrying screws 23 provided with adjustable nuts 24 on which the chart 18 is mounted. By regulating the positions of the nuts on the screws, the distance from the chart of said plate with its ink film may be increased or diminished at will.

We claim:—

1. The combination in a graphic recorder of a chart; a pen; and means independent of the pen for producing a film of ink for supplying said pen; with means for causing the pen to transfer limited amounts of ink from the film to the chart to form records thereon.

2. The combination in a graphic recorder of a chart; a pen; means for producing a film of ink in the path of movement of the pen; and means for causing said pen to periodically pass through the ink film into engagement with the chart.

3. The combination in a graphic recorder of a chart; a plate having a slot therethrough; means for supplying ink to said slot to form a film across the same; a pen; and means for periodically causing said pen to pass through the ink film into engagement with the chart.

4. The combination in a graphic recorder of a chart; a plate having a longitudinally tapering slot therethrough; means for supplying ink to the widest portion of said slot to form a film across the same; and a pen mounted to pass through the ink film into engagement with the chart.

5. The combination in a graphic recorder of a chart; a plate having a longitudinally tapering slot therethrough; means for supplying ink to the widest part of the slot to form a film across the same; a pen; and means for periodically causing the pen to pass through said slot into engagement with the chart.

6. The combination in a graphic recorder of means for providing a capillary film of ink; a movable pen capable of passing through said ink film; and means for receiving a record from the pen.

7. The combination in a graphic recorder of a structure provided with an elongated slot tapering in width from one end to the other; an ink well in communication with the wider end of said slot; means for supporting a chart adjacent said structure; and a pen capable of passing through the slot into engagement with a chart carried by the supporting means.

8. The combination in a graphic recorder of a plate having an elongated slot therethrough tapering from one face to the other of said plate and also tapering from one end to the other; means for supplying ink to the slot to form a film across the same; means for supporting a chart adjacent the plate; a pen; and means for causing said pen to pass through the film of ink into engagement with a chart carried by said supporting means.

9. The combination in a graphic recorder of a structure having a downwardly tapering slot therethrough; means for supplying ink to said slot to form a film across the same; means for supporting a chart adjacent the plate; and a pen mounted to pass through the ink film into engagement with the chart to form a record thereon.

10. The combination in a graphic recorder of a chart supporting device; a pen having an ink retaining spur diverging from its point; means for supplying ink to the pen; and means for causing the pen to engage a chart on said supporting device.

11. The combination in a graphic recorder of a chart supporting structure; a structure mounted thereon and having an open slot; means for supplying ink to said slot to form a capillary film across the same; a pen mounted to pass through the slot into engagement with a chart carried by said device and means for varying the distance between the structure having the ink film and the chart to vary the amount of ink delivered to the latter by the pen.

In testimony whereof, we have signed our names to this specification, in the presence of two subscribing witnesses.

HARRY FALTERMAYER.
CHARLES B. THWING.

Witnesses:
D. C. DRAPER,
F. C. MAHONEY.